United States Patent [19]

Hara

[11] Patent Number: 4,894,596

[45] Date of Patent: Jan. 16, 1990

[54] VELOCITY CONTROL APPARATUS

[75] Inventor: Ryuichi Hara, Yamanashi, Japan

[73] Assignee: Fanuc Ltd., Minamitsuru, Japan

[21] Appl. No.: 265,676

[22] PCT Filed: Apr. 27, 1988

[86] PCT No.: PCT/JP88/00420

§ 371 Date: Oct. 31, 1988

§ 102(e) Date: Oct. 31, 1988

[87] PCT Pub. No.: WO88/08562

PCT Pub. Date: Nov. 3, 1988

[30] Foreign Application Priority Data

Apr. 30, 1987 [JP] Japan .................................. 62-107262

[51] Int. Cl.⁴ ............................................. G05B 11/18
[52] U.S. Cl. .................................. 318/568.1; 318/567;
 318/573; 318/571; 364/513; 364/474.14
[58] Field of Search ....................... 318/564–573,
 318/592–632, 640; 364/474.11, 474.34, 513

[56] References Cited

U.S. PATENT DOCUMENTS

| | | | |
|---|---|---|---|
| 4,497,028 | 1/1985 | Nozawa et al. | 364/474.14 |
| 4,554,497 | 11/1985 | Nozawa et al. | 318/571 X |
| 4,600,870 | 7/1986 | Martin | 318/610 |
| 4,652,804 | 3/1987 | Kawamura et al. | 318/573 X |
| 4,683,786 | 8/1987 | Kersten et al. | 364/474.02 |
| 4,706,003 | 11/1987 | Nakashima et al. | 318/615 X |
| 4,728,872 | 3/1988 | Kishi et al. | 318/567 X |
| 4,740,885 | 4/1988 | Gase et al. | 364/513 X |

Primary Examiner—William M. Shoop, Jr.
Assistant Examiner—Paul Ip
Attorney, Agent, or Firm—Staas & Halsey

[57] ABSTRACT

A velocity control apparatus according to the invention controls velocity when moving the movable element of a robot hand or NC machine tool and includes velocity override control for changing the movable element command velocity at a predetermined rate, and acceleration/deceleration circuits (2X, 2Y) of a time constant inversely proportional to a velocity set by the override control. When the amount of a velocity override is changed, the time constant of the acceleration/deceleration circuits (2X, 2Y) is altered in dependence upon the commanded velocity, and an accumulated quantity of command pulses at the time of acceleration/deceleration is controlled so as to be held constant. This makes it possible to control movement at a predetermined velocity without changing the trajectory of the movable element at a corner portion.

2 Claims, 3 Drawing Sheets

FIG. 4a
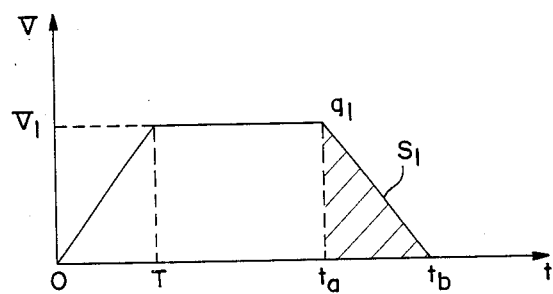
FIG. 4b
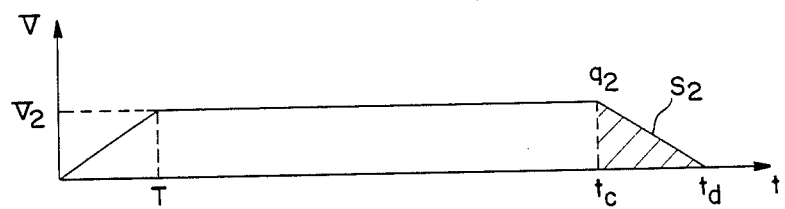
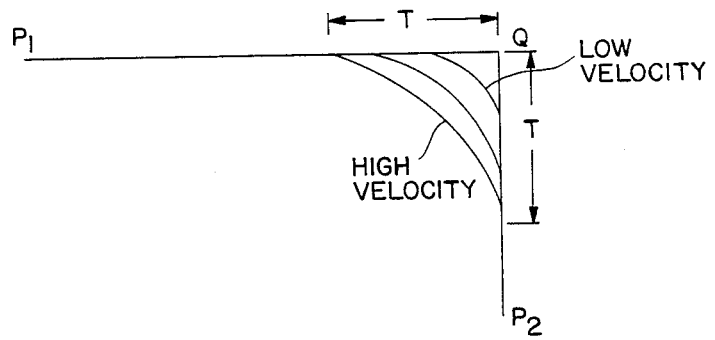
FIG. 5

4,894,596

VELOCITY CONTROL APPARATUS

TECHNICAL FIELD

This invention relates to a velocity control apparatus for controlling velocity when moving the movable element of a robot hand or NC machine tool.

BACKGROUND ART

In an ordinary robot or NC, an acceleration/deceleration filter is used for each axis to smoothly control the movement of a movable element up to a target position, and the velocity of the element is commanded by a program. This enables movement to be controlled along a set trajectory at a predetermined velocity. Accordingly, once programming has been correctly performed, the trajectory of motion of the movable element is always the same and error at execution of an activity does not pose a problem.

However, there are cases, as, for example, in a conventional teaching-type robot, in which the object under control has a plurality of drive mechanisms and, in a test run, a trajectory of motion is set upon reducing velocity by a velocity override mechanism to establish a velocity different from the velocity that will actually prevail when the program is executed. In a case such as this, the quantity of command pulses that will accumulate at the time of acceleration and at the time of deceleration will differ in dependence upon the commanded velocity. Also, when performing corner machining by a machine tool, the amount of override changes and a similar problem can occur.

FIGS. 4(a), (b) are explanatory views showing examples of acceleration/deceleration characteristics, in which time t is plotted along the horizontal axis and velocity V along the vertical axis. FIGS. 4(a), (b) show examples in which an acceleration/deceleration time constant is set to a constant value T and the relation between $V_1$ and $V_2$ is $V_1 = 2V_2$. In this case an area $S_1$ defined by a triangle $q_1$-$t_a$-$t_b$ and an area $S_2$ defined by a triangle $q_2$-$t_c$-$t_d$ each represent an amount of accumulated command pulses, where the relation $S_1 > S_2$ holds. Therefore, even after a program commanding movement of a movable element is set, an override set independently of the movement command causes the trajectory at a corner portion to vary in dependence upon the amount of velocity override. A problem that arises is that, in an arc welding robot or the like, it becomes necessary to apply a correction in accordance with position information from a visual sensor and the like.

FIG. 5 is a view for explaining an example in which a difference in trajectory occurs at a corner portion, as mentioned above. This shows that when acceleration/deceleration control of a servomotor is performed at the same time constant T in a case where a trajectory $P_1$-Q-$P_2$ passing through a corner portion Q is set, the extent to which a movable member strays from a normal trajectory is greater at a high velocity than at a low velocity.

DISCLOSURE OF THE INVENTION

The present invention has been devised to solve the foregoing problem and its object is to provide a velocity control apparatus in which velocity override control is made possible without causing a change in trajectory.

In accordance with the present invention, there is provided a velocity control apparatus having drive mechanisms for a plurality of axes for controlling movement of a movable member along a set trajectory at a predetermined velocity, comprising velocity override means for changing and setting a commanded velocity of the movable element at a predetermined rate based on a velocity commanded in each direction of movement, and acceleration/deceleration means having a time constant capable of being changed in inverse proportion to a velocity set by the override means.

The velocity control apparatus of the invention makes it possible to control the movement of a movable element at a predetermined velocity without changing the trajectory at a corner portion when the velocity of the movable element is controlled.

BRIEF DESCRIPTION OF THE DRAWINGS

FIG. 5 is a view for describing an error produced in a trajectory at a corner portion.

BEST MODE FOR CARRYING OUT THE INVENTION

An embodiment of the present invention will now be described in detail with reference to the drawings.

Figure 2A:
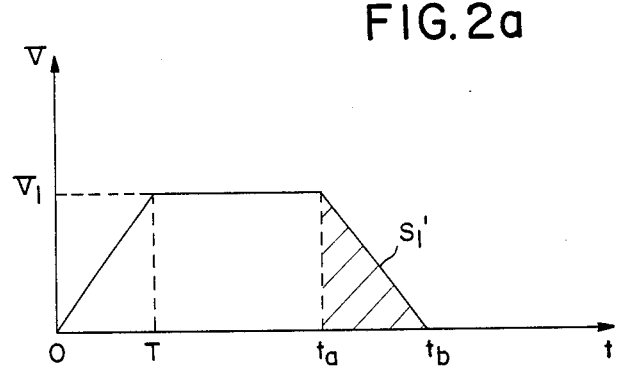

FIGS. 2(a), (b) are explanatory views for describing the fundamental principle of the invention. The basic concept of the invention is to set a time constant in inverse proportion to a change in override and effect control in such a manner that the accumulated quantity of command pulses is rendered constant regardless of velocity.

Figure 2B:
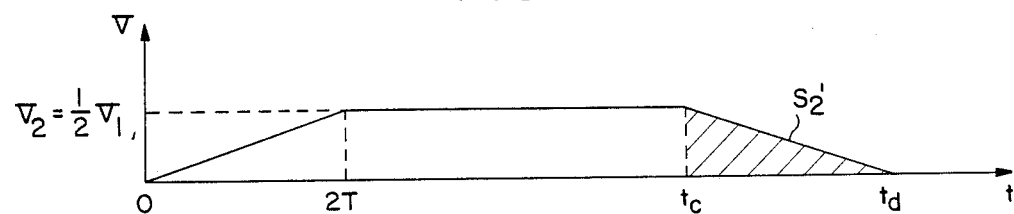

More specifically, assume that when a velocity $V_1$ in FIG. 2(a) is made a value corresponding to an override of 100%, a velocity $V_2$ in FIG. 2(b) has a value corresponding to an override of 50%. In such case, a time constant T in FIG. 2(a) is set to ½ Of the time constant of FIG. 2(b). Generally, in a case where override varies from X% to Y%, a time constant T' that prevails when the override is Y% is set as follows:

$$T' = T \cdot (X/Y)$$

where T is the constant that prevails when the override is X%.

By setting the time constants in this manner, the area $S_1'$ of the triangle defined by the slanting lines in FIG. 2(a) and the area $S_2'$ of the triangle defined by the slanting lines in FIG. 2(b) become equal so that the trajectory at a corner portion can be controlled so as to remain constant even if velocity changes.

Figure 1A:
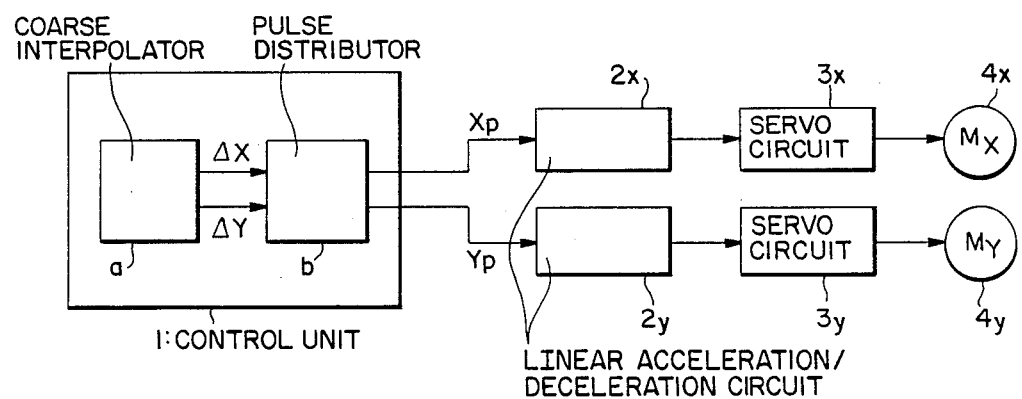
FIGS. 1(a), (b) are block diagrams illustrating the general construction of the invention, FIGS. 2(a), (b) are explanatory views for describing the fundamental principle of the invention.

FIG. 1(a) is a block diagram illustrating the general construction of the invention. In this Figure, a control unit 1 is operated both when running a program and when performing an override test run. For example, in a case where two axes, namely X and Y axes, are controlled, feed rate and amounts of movement along the X and Y axes are set, whereby a coarse interpolator a computes components ΔX, ΔY of amounts of movement along the respective X and Y axes and outputs these components to a pulse distributor b. The pulse distributor b executes a pulse distribution computation in accordance with the coarse interpolation data and generates distributed pulses Xp, Yp, the number whereof correspond to ΔX, ΔY, in one sampling period. These pulse are outputted to linear acceleration/deceleration circuits 2X, 2Y. Each of these linear acceleration/deceleration circuits 2X, 2Y is composed of a predetermined number of buffer registers, an accumulator, a divider and the like. The latest coarse interpolation data ΔXn, ΔYn are stored in the buffer registers at every sampling and a signal for performing linear acceleration/deceleration control of the kind shown in FIGS. 2(a), (b) is formed by addition and division processing.

The outputs of the linear acceleration/deceleration circuits 2X, 2Y are applied to an X-axis servomotor 4X and a Y-axis servomotor 4Y via servo circuits 3X, 3Y, respectively, thereby driving these servomotors.

Ordinarily, the setting of different time constants of the kind shown in FIGS. 2(a), (b) is performed when the axes are at rest. However, since there are occasions where override is varied even during operation along an axis, it is sometimes necessary to alter the time constants by providing two acceleration/deceleration means each of which acts upon the same drive mechanism.

Figure 3:
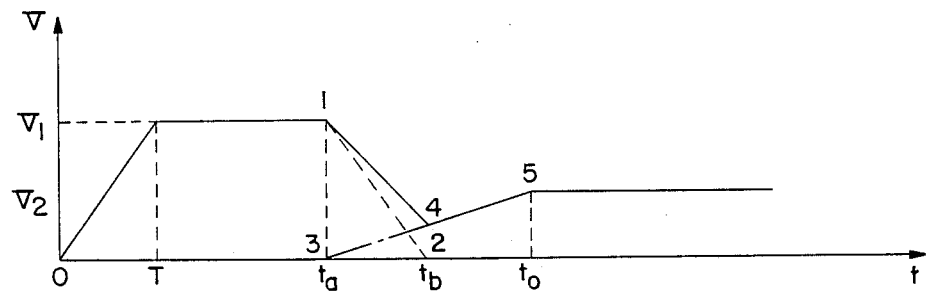
FIG. 3 is a view for describing an embodiment adapted to change override and alter a time constant during operation along an axis, FIGS. 4(a), (b) are explanatory views illustrating examples of acceleration/deceleration characteristics.

FIG. 3 is an explanatory view illustrating an example of an arrangement for altering a time constant by changing override during operation along an axis. In the example illustrated, a servomotor is initially subjected to acceleration and constant-velocity control at the override characteristic of override $V_1$, and the servomotor is then decelerated in the time interval $t_a$–$t_b$. Deceleration starts at time $t_a$, and acceleration is performed in the interval $t_a$–$t_o$ at the characteristic of override $V_2$. In other words, the servomotor is driven at a characteristic ①-④ obtained by combining the deceleration characteristic ①-② and the acceleration characteristic ③-④. As a result, it is possible to control changeover of the time constant by modification of the override during operation along the axis.

Figure 1B:
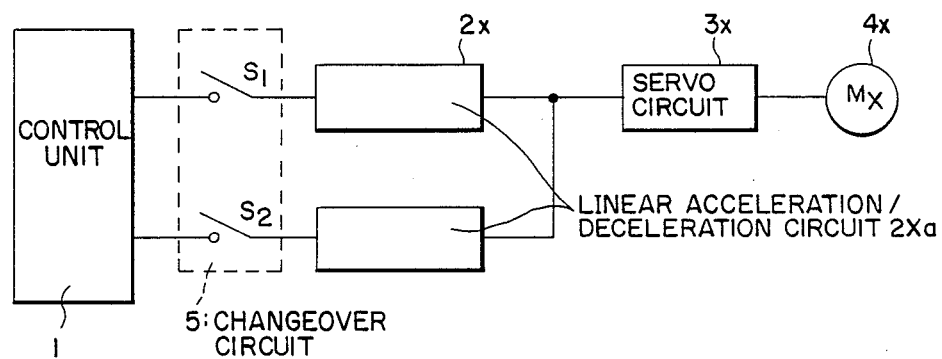

FIG. 1(b) is a block diagram showing the general construction of a velocity control apparatus for controlling servomotors in accordance with the characteristic depicted in FIG. 3. In this Figure, only the circuitry relating to the X axis is shown for the sake of simplicity. Here the acceleration/deceleration circuit is composed of two circuits 2Xa, 2Xb having different characteristics.

When the linear acceleration/deceleration circuit 2Xa is made to correspond to the characteristic of override $V_1$ and the linear acceleration/deceleration circuit 2Xb is made to correspond to the characteristic of override $V_2$, acceleration/deceleration control is such that switch $S_1$ is closed to actuate the circuit 2Xa in the interval 0–$t_b$ in the characteristic of FIG. 3, and switch $S_2$ is closed to actuate the circuit 2Xb in the interval $t_a$–$t_o$, and both circuits 2Xa, 2Xb are actuated in the interval $t_a$–$t_b$.

Though an embodiment of the present invention has been described, the invention is not limited thereto and can be modified in a variety of ways without departing from the scope of the claims.

INDUSTRIAL APPLICABILITY

According to the velocity control apparatus of the present invention, when the amount of a velocity override is changed, the time constant of acceleration/deceleration means is changed in dependence upon a commanded velocity, the quantity of command pulses that accumulate at the time of acceleration and at the time of deceleration can be controlled so as to be held constant, and the movement of a movable element can be controlled at a predetermined velocity without changing the trajectory. Moreover, velocity override control can be performed without causing a change in trajectory even in a state where the drive mechanism of an axis on which the aforesaid acceleration/decelertion means acts is not at rest.

I claim:

1. A velocity control apparatus having drive mechanisms for a plurality of axes for controlling movement of a movable member along a set trajectory at a predetermined velocity, comprising:

velocity override means for changing and setting a commanded velocity of the movable member at a predetermined rate based on a velocity commanded for each direction of movement; and acceleration/deceleration means, having a time constant capable of being changed in inverse proportion to a velocity set by said velocity override means, for driving the movable member.

2. A velocity control apparatus according to claim 1, further comprising:

another acceleration/deceleration means, having a time constant capable of being changed in inverse proportion to a velocity set by said velocity override means, for controlling the movable member in dependence upon a change in the commanded velocity during movement of the movable member so that when the velocity command is changed by said velocity override means, acceleration/deceleration of the movable member is controlled upon setting each of said acceleration/deceleration means to a time constant inversely proportional to the velocity changed.

* * * * *